United States Patent [19]
Yamaoka

[11] Patent Number: 5,263,558
[45] Date of Patent: Nov. 23, 1993

[54] ELECTROMAGNETIC STRUT ASSEMBLY

[75] Inventor: Fumiyuki Yamaoka, Kanagawa, Japan

[73] Assignee: Atsugi Unisia Corporation, Kanagawa, Japan

[21] Appl. No.: 778,515

[22] Filed: Oct. 18, 1991

[30] Foreign Application Priority Data

Oct. 20, 1990 [JP] Japan .................................. 2-282713
Feb. 27, 1991 [JP] Japan .................................. 3-031204

[51] Int. Cl.$^5$ .......................... F16F 15/03; F16F 6/00; B60G 17/00
[52] U.S. Cl. ..................................... 188/267; 188/285
[58] Field of Search .................. 188/267, 285, 299

[56] References Cited

U.S. PATENT DOCUMENTS

| | | |
|---|---|---|
| 2,906,899 | 9/1959 | Geneslay .................. 188/267 X |
| 3,941,402 | 3/1976 | Yankowski et al. . |
| 4,892,328 | 1/1990 | Kurtzman et al. . |
| 4,900,054 | 2/1990 | Kessler . |

FOREIGN PATENT DOCUMENTS

| | | |
|---|---|---|
| 391066 | 10/1990 | European Pat. Off. ............ 188/267 |
| 3126470 | 1/1983 | Fed. Rep. of Germany ...... 188/267 |
| 2-37016 | 2/1990 | Japan . |
| 90/14969 | 12/1990 | World Int. Prop. O. . |

Primary Examiner—Robert J. Oberleitner
Assistant Examiner—Josie A. Ballato
Attorney, Agent, or Firm—Bachman & LaPointe

[57] ABSTRACT

An electromagnetic strut comprises a coil assembly including a plurality of coils arranged along a predetermined axis, and a magnetic device movable relative to the coil assembly along the predetermined axis. The magnetic device includes a magnetic circuit which produces two magnetic fields spaced at a distance along the predetermined axis, Each of the plurality of coils has an axial dimension less than the distance at which the two magnetic fields of the magnetic circuit are spaced.

20 Claims, 6 Drawing Sheets

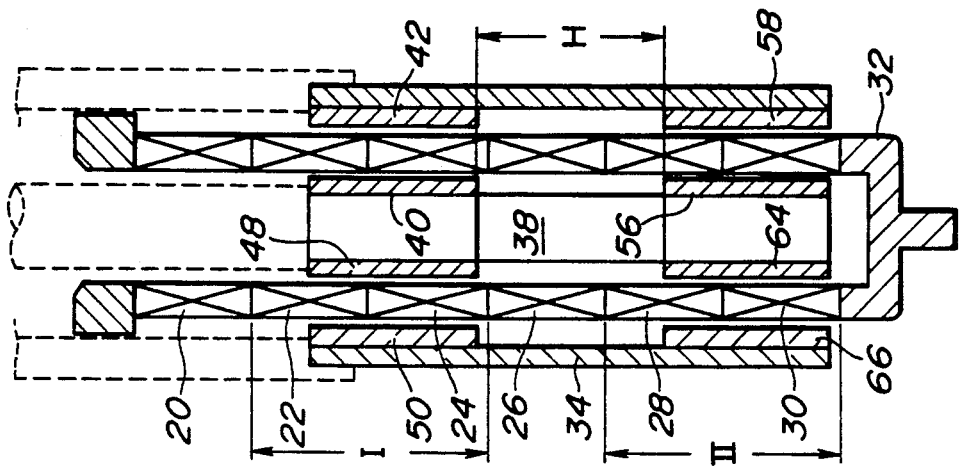
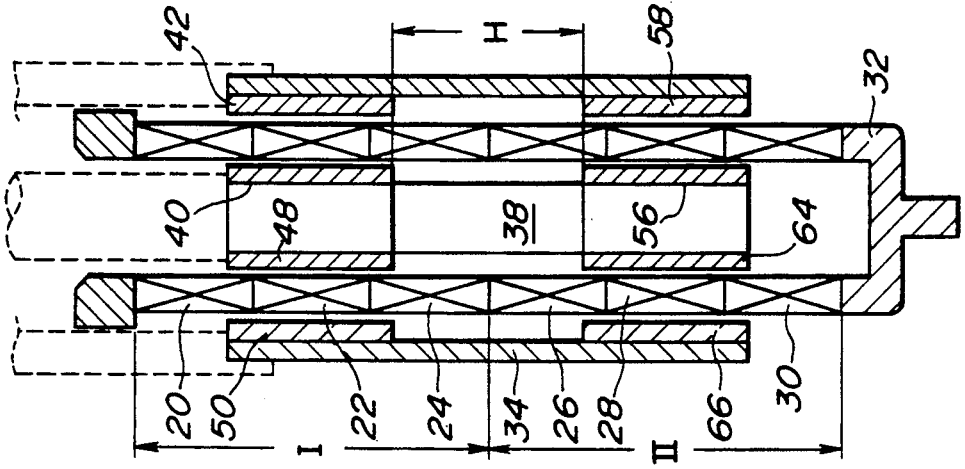
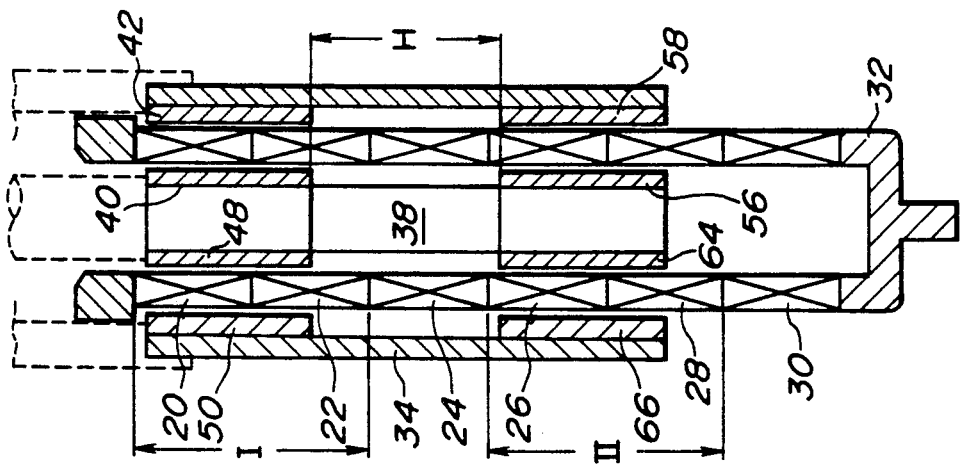

ELECTROMAGNETIC STRUT ASSEMBLY

BACKGROUND OF THE INVENTION

The present invention relates to an electromagnetic strut for a vehicle suspension unit.

Japanese Patent Application First (unexamined) Publication No. 2-37016 claiming priority on U.S. Pat. application Ser. No. 200,025 filed May 27, 1988, now U.S. Pat. No. 4,892,328, issued Jan. 9, 1990 to Kurtzman et al., which discloses an electromagnetic strut. This known electromagnetic strut includes a magnetic device surrounded by a coil assembly. The magnetic device includes a rod of a ferromagnetic material and a permanent magnet attached to the rod. The magnetic device is movable relative to the coil assembly in response to movement of a vehicle body relative to a wheel assembly. This known electromagnetic strut has a potential problem that the strength of a magnetic field is difficult to increase to a sufficiently high level. If, for example, it is demanded to increase a maximum stroke, the magnetic path is elongated, resulting in an increased resistance to the magnetic path. If it is required to increase the effective cross sectional area of the magnetic path, the rod with increased diameter is needed, resulting in an increase is radial dimension of the strut.

Accordingly, the present invention aims at solving the potentional problem incorporated in the known electromagnetic struts.

A specific object of the present invention is to provide an electromagnetic strut which is improved such that a magnetic field with a sufficiently great strength is maintained irrespective of a change in the maximum stroke.

Another specific object of the present invention is to provide an electromagnetic strut which is improved such that a magnetic path has a sufficiently large effective cross sectional area without causing any increase in a radial dimension of the strut.

SUMMARY OF THE INVENTION

An electromagnetic strut comprises:
a coil assembly; and
a magnetic device movable relative to said coil assembly along a predetermined axis,
wherein said magnetic device includes a magnetic circuit.

According to one feature of the electromagnetic strut, said coil assembly includes a plurality of coils arranged along said predetermined axis, and said magnetic circuit produces two magnetic fields spaced at a distance along said predetermined axis.

According to further feature of the electromagnetic strut, said magnetic device includes a plurality of such magnetic circuits equi-angularly spaced one after another.

According to still further feature of the electromagnetic strut, said magnetic device includes a dual-walled support structure having an outer tube of a ferromagnetic material and an inner rod of a ferromagnetic material, a plurality of first pairs of opposed permanent magnets, each of said first pairs being attached to said outer tube and said inner rod, respectively, a plurality, corresponding in number to said plurality of first pairs, of second pairs of opposed permanent magnets, each of said second pairs being attached to said outer tube and said inner rod, respectively.

According to still further and specific feature of the electromagnetic strut, said outer tube has inner wall means defining a cylindrical bore including cylindrical end bore sections and a reduced diameter intermediate cylindrical bore section, said inner wall means including end wall portions defining said cylindrical end bore sections, respectively, and transfer wall portions tapering away from said cylindrical end bore sections, respectively, toward said reduced diameter intermediate cylindrical bore section, and said inner rod having reduced diameter end portions and portions tapering toward said reduced diameter end portions, respectively.

According to another feature of the electromagnetic strut, said magnetic device includes a permanent magnet and a support structure having a rod of a ferromagnetic material, said rod having a reduced diameter portion and portions tapering toward said reduced diameter portion, and said permanent magnet engages said reduced diameter portion and said portions tapering toward said reduced diameter portion.

BRIEF DESCRIPTION OF THE DRAWINGS

FIG. 6 shows one position of the magnetic device relative to a coil assembly;

FIG. 7 shows another position of the magnetic device relative to the coil assembly;

FIG. 8 shows other position of the magnetic device relative to the coil assembly;

DETAILED DESCRIPTION OF THE INVENTION

Figure 1:
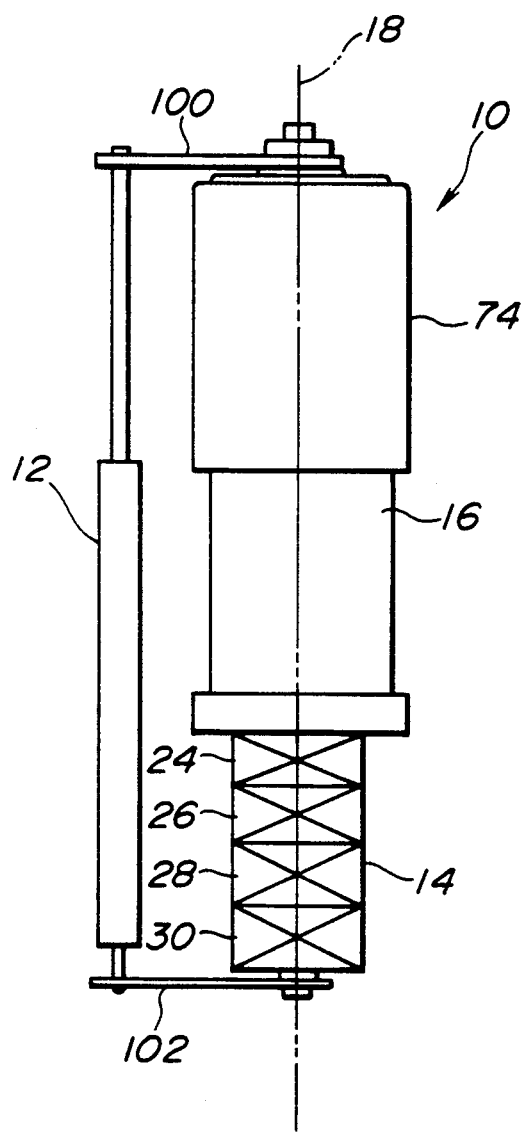
FIG. 1 is a plan view of an embodiment of an electromagnetic strut according to the present invention.

Referring to the accompanying drawings and more particularly to FIG. 1, an electromagnetic strut 10 with a stroke sensor 12 is shown. The electromagnetic strut 10 generally comprises a coil assembly 14, and a magnetic device 16 which is movable relative to the coil assembly along a longitudinal axis 18. When it is used in a vehicle suspension unit, the electromagnetic strut 10 is operatively connected between one of wheel assemblies and a vehicle body with the coil assembly 14 linked to the corresponding wheel assembly and the magnetic device 16 linked to the vehicle body. Alternatively, the coil assembly 14 may be linked to the vehicle body with the magnetic device 16 linked to the corresponding wheel assembly.

Figure 2:
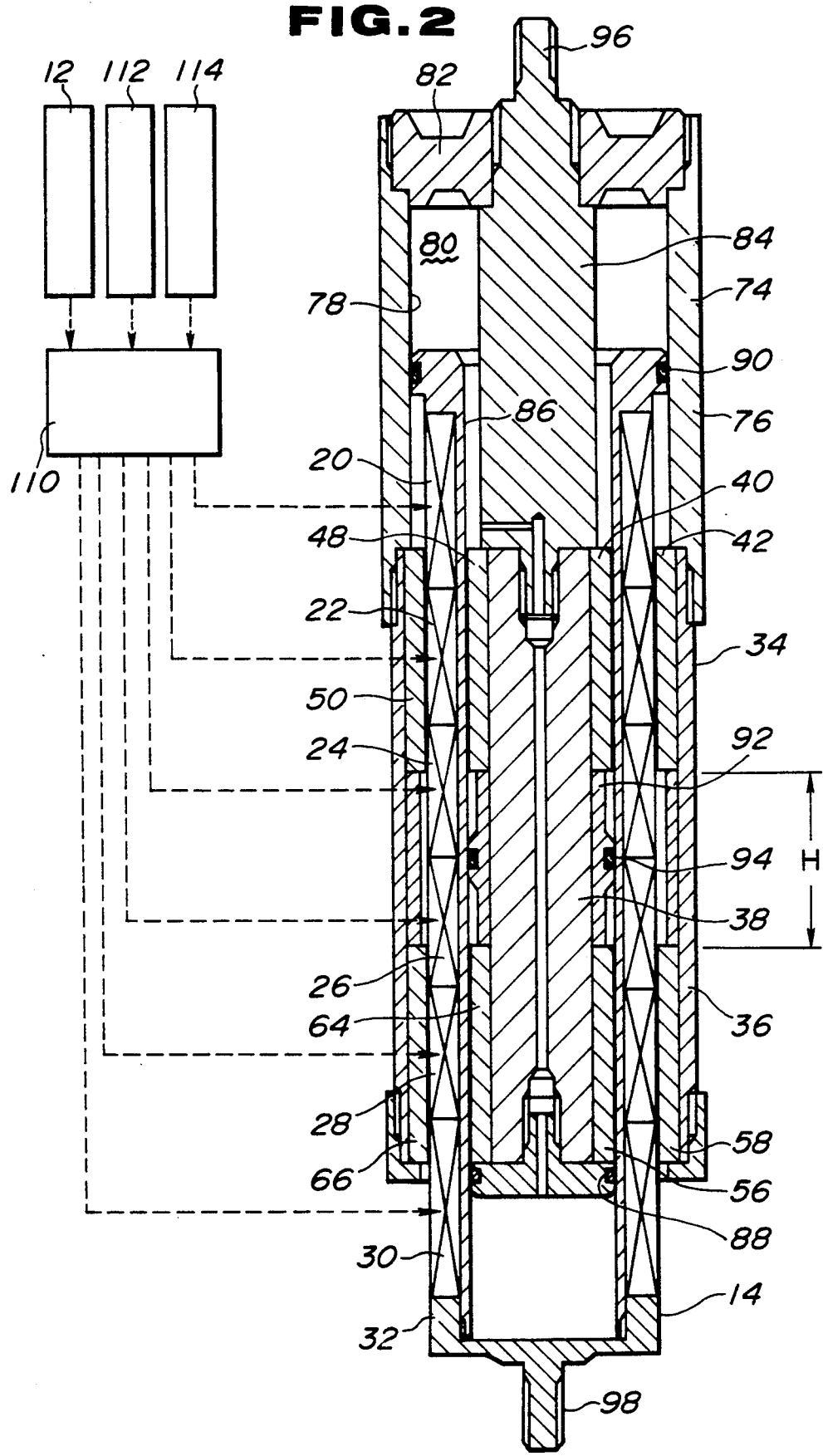
FIG. 2 is a longitudinal section of the strut along a longitudinal axis thereof in operating association with a control arrangement.

Referring to FIG. 2, the coil assembly 14 includes a plurality of, six in this embodiment, coils 20, 22, 24, 26, 28 and 30 arranged along the longitudinal axis 18, and a coil carrier 32 supporting these coils.

The magnetic device 16 includes a dual-walled support structure 34 having an outer tube 36 of a ferromagnetic material and an inner rod 38 of a ferromagnetic material. As will be clear as the description proceeds, the magnetic device 16 includes four equi-angularly spaced magnetic circuits, each producing two magnetic fields spaced at a distance H along the longitudinal axis 18.

Figure 3:
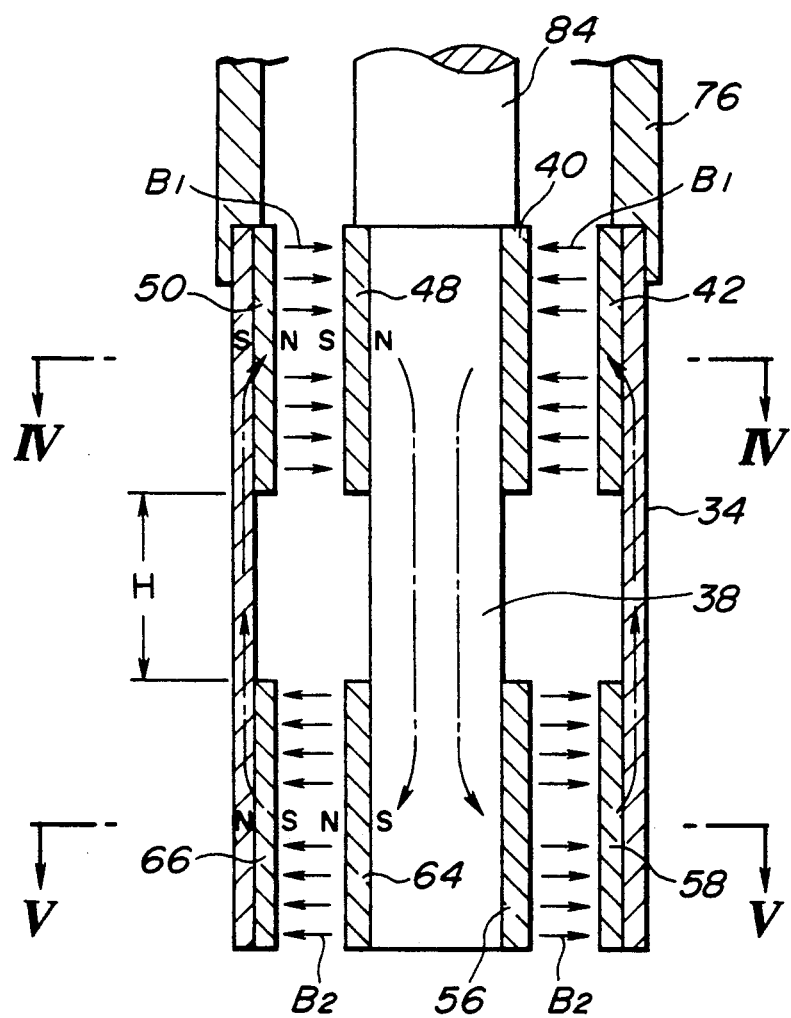
FIG. 3 is a fragmentary section of a magnetic device of the strut.
Figure 4:
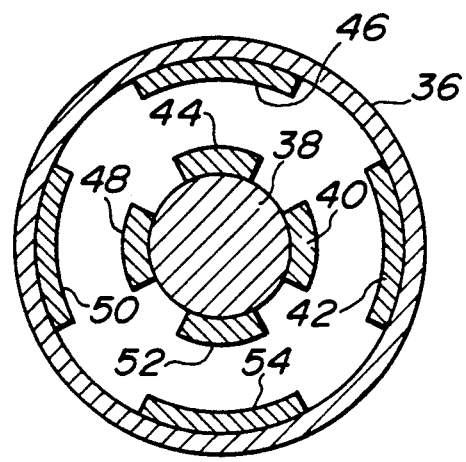
FIG. 4 is a cross section taken through the line IV—IV of FIG. 3.
Figure 5:
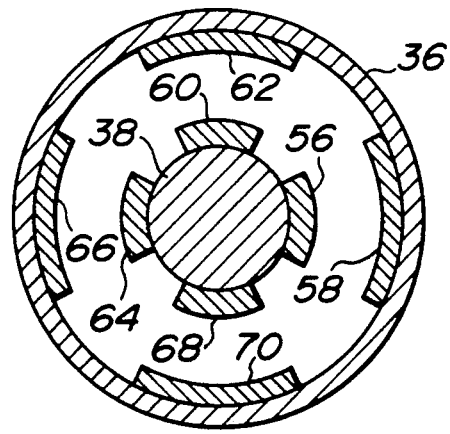
FIG. 5 is a cross section taken through the line V—V of FIG. 3.

As best seen in FIGS. 3 and 4, four first pairs of opposed permanent magnets 40 and 42, 44 and 46, 48 and 50, and 52 and 54 are arranged. The permanent magnets of each of these pairs are attached to the inner rod 38 and the outer tube 36, respectively. Specifically, the permanent magnets 40, 44, 48 and 52 are attached to the inner rod 38, while the permanent magnets 42, 46, 50 and 54 are attached to the outer tube 36. As best seen in FIGS. 3 and 5, four second pairs of opposed permanent magnets 56 and 58, 60 and 62, 64 and 66, and 68 and 70 are arranged in axial alignment with and spaced at the distance H along the longitudinal axis 18 from the first pairs of permanent magnets 40 and 42, 44 and 46, 48 and 50, and 52 and 54, respectively. The permanent magnets of each of these second pairs are attached to the inner rod 38 and the outer tube 36, respectively. Specifically, the magnets 56, 60, 64 and 68 are attached to the inner rod 38, while the magnets 58, 62, 66 and 70 are attached to the outer tube 36.

It will now be appreciated that the pair of magnets 40 and 42 cooperate with the aligned pair of magnets 56 and 58, outer tube 36 and inner rod 38 to form a first magnetic circuit, the pair of magnets 44 and 46 cooperate with the aligned pair of magnets 60 and 62, outer tube 36 and inner rod 38 to form a second magnetic circuit, the pair of magnets 48 and 50 cooperate with the aligned 64 and 66, outer tube 36 and inner rod 38 to form a third magnetic circuit, and the pair of magnets 52 and 54 cooperate with the aligned pair of magnets 68 and 70, outer tube 36 and inner rod 38 to form a fourth magnetic circuit.

As shown in FIG. 3, a radially inwardly directed magnetic field $B_1$ as illustrated by magnetic force lines are produced between each of the first pairs of magnets, while a radially outwardly directed magnetic field $B_2$ as illustrated by magnetic force lines is produced between each of the second pairs of magnets.

Referring back to FIG. 2, the magnetic device 16 has a dust cover 74 fixedly coupled with the outer tube 36. The dust cover 74 includes a cylinder 76 with a cylindrical inner wall 78 defining a cylindrical bore 80. An end plug 82 is fixedly coupled with the cylinder 76 to close the cylindrical bore 80. The dust cover 74 includes an inwardly projected support 84 fixed to the end plug 82. The inwardly projected support 84 is fixedly coupled with the inner rod 38 at one end thereof. The coil carrier 32 includes a sleeve 86 around which the coils 20, 22, 24, 26, 28 and 30 are wound. The sleeve 86 extends through an annular space between the outer tube 36 and the inner rod 38 so that it extends through the magnetic fields $B_1$ and $B_2$. Each of the coils 20, 22, 24, 26, 28 and 30 has an axial dimension less than the distance H.

In order for smooth movement of the magnetic device 16 relative to the coil assembly 14 in the longitudinal axis, the magnetic device 16 includes a journal 88 fixedly attached to the inner rod 38 and engaging the sleeve 86, and the coil carrier 32 includes a journal 90 engaging the cylindrical inner wall 78 of the cylinder 76 of the dust cover 74. Preferably, an annular spacer 92 is coupled with the inner rod 38 and disposed between the magnets 40, 44, 48 and 52 and the magnets 56, 60, 64 and 68. This annular spacer 92 includes a journal 94 engaging the sleeve 86 of the coil carrier 32.

The inwardly projected support 84 has an integral bolt 96, and the coil carrier 32 has an integral bolt 98. As shown in FIG. 1, two arms 100 and 102 are engaged with the bolts 96 and 98. With these arms 100 and 102, the stroke sensor 12 is operatively connected to the magnetic device 16 and the coil assembly 14.

Under the control of a control unit 110, each of the coils 20, 22, 24, 26, 28 and 30 is short-circuited via a variable resistor in a shock absorber mode.

In this shock absorber mode, movement of the magnetic device 16 relative to the coil assembly 14 induces electric current in the coils passing through the magnetic fields $B_1$ and $B_2$ and the electric current is converted into heat when passing through the variable resistor. As a result, a damping force is produced.

Under the control of the control unit 110, each of the coils 20, 22, 24, 26, 28 and 30 is forwardly biased or reversely biased in a vehicle body height control mode. During forward bias, electric current passes through the coil in one direction, while during reverse bias, electric current passes through the coil in the opposite direction.

The principle manner of controlling supply of electric current to the coil assembly 14 is briefly explained below in connection with FIGS. 6, 7 and 8.

FIG. 6 shows an extended position of the magnetic device 16 relative to the coil assembly 14. In this position, two coils 20 and 22 disposed in the magnetic field $B_1$ (group I) and two coils 26 and 28 disposed in the magnetic field $B_2$ (group II) are biased and thus energized in the opposite directions. Supply of electric current to the other two coils 24 and 30 which are not disposed in the magnetic fields $B_1$ and $B_2$ is interrupted.

FIG. 7 shows a neutral state position of the magnetic device 16 relative to the coil assembly 14. In this position, the three coils 20, 22 and 24 are disposed in the magnetic field $B_1$ and the other three coils 26, 28 and 30 are disposed in the magnetic field $B_2$. Thus, the coils 20, 22 and 24 (group I) and the coils 26, 28 and 30 (group II) are biased and thus energized in the opposite directions.

FIG. 8 shows a contracted position of the magnetic device 16 relative to the coil assembly 14. In this position, the two coils 22 and 24 are disposed in the magnetic field $B_1$, and the two coils 28 and 30 are disposed in the magnetic field $B_2$. Thus, the coils 22 and 24 (group I) and the coils 28 and 30 (group II) are biased and thus energized in the opposite directions. Supply of electric current to the other coils 20 and 26 is interrupted.

Switch among these three patterns is made under the control of the control unit 110. The control unit 110 is operatively coupled with the stroke sensor 12, an acceleration sensor 112 and a load sensor 114. The stroke sensor 12 detects a stroke or displacement of movement of the magnetic device 16 relative to the coil assembly 14 and generates a stroke indicative signal indicative of the stroke detected. The acceleration sensor 112 detects a vertical acceleration of movement of the magnetic device 16 relative to the coil assembly 14 and generates an acceleration indicative signal indicative of the acceleration detected. This acceleration indicative signal is used in the control unit 110 to derive a vertical speed of the vehicle body. The load sensor 114 detects a load which the magnetic device 16 and the coil assembly 14 are subject to along the longitudinal axis 18 and generates a load indicative signal indicative of the load detected. The signals of the stroke sensor 12, acceleration sensor 112 and load sensor 114 are fed to the control unit 110.

The control unit 110 is designed such that it controls the electromagnetic strut 10 in response to the stroke indicative signal from the stroke sensor 12 in the vehicle body height control mode, and controls the strut 10 in response to the acceleration indicative signal and the load indicative signal from the acceleration sensor 112 and the load sensor 114 in the shock absorber mode.

In the shock absorber mode, the variable resistor is adjusted in accordance with a predetermined control logic based on the acceleration indicative signal and the load indicative signal. As a result, the damping force can be varied in response to the vertical speed of the vehicle body and the load. It will be appreciated that there is no electric power consumption in this shock absorber mode.

In the vehicle height control mode, the direction and magnitude of a force created within the electromagnetic strut 10 are variable by selecting the direction of energization and the amount of electric current supplied to the coil assembly 14. If the control of the force is such that a change in the vehicle body clearance is always cancelled, the vehicle body clearance is maintained. If the control of the force is such that transmission of an input force from the road surface to the vehicle body is always cancelled, the vehicle body height is maintained.

It will now be appreciated that the previously described embodiment of an electromagnetic strut produces a sufficiently large force irrespective of the length of stroke of the magnetic device relative to the coil assembly since the length of the magnetic path of each of the magnetic circuits is left invariable even if an increase in stroke is demanded.

According to the previously described embodiment, it is not required to keep supplying electric current to all of the coils of the coil assembly in producing the force, resulting in reduction in electric energy consumption.

Although in the embodiment, permanent magnets are used, they may be replaced with electromagnets.

It the embodiment, the number of turns of the coils 20, 22, 24, 26, 28 and 30 is the same. If desired, the coils may have different numbers of turns. In the this case, it is possible to vary the force created by the electromagnetic strut depending on the position of stroke.

Using increased number of coils with reduced axial dimension, it is possible to decrease the distance H. With the thus reduced distance, since resistance in magnetic path decreases, magnets with more increased area may be used. This causes an increase in force created by the electromagnetic strut.

Figure 9:
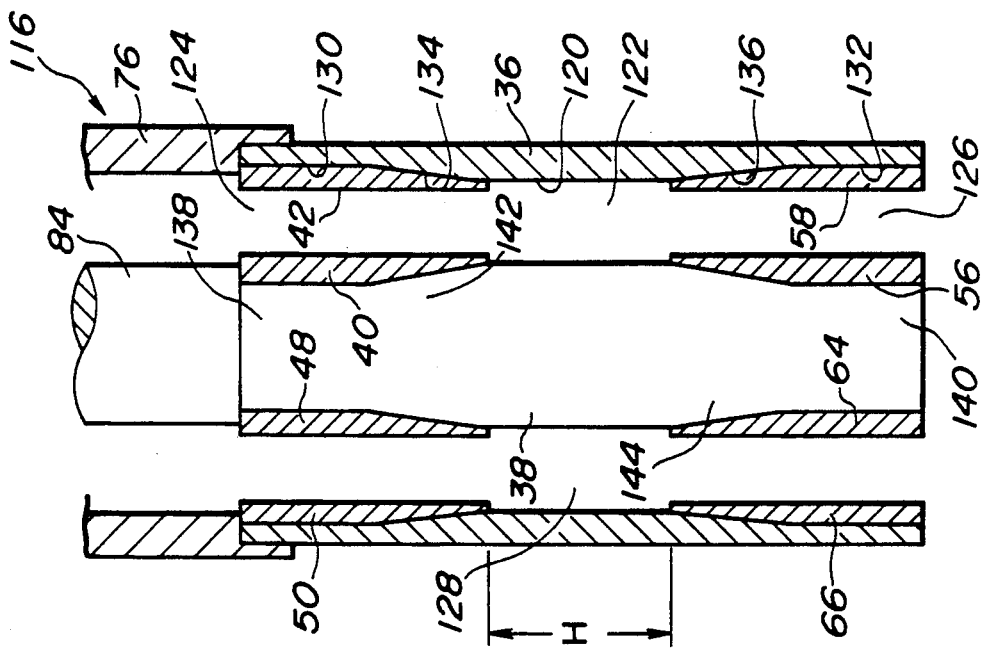
FIG. 9 is a similar view to FIG. 3 showing an alternative structure of a magnetic device.

FIG. 9 shows an alternative magnetic device 116 which is designed to increase an effective cross sectional area of a magnetic path through an outer tube 36 of a ferromagnetic material and that of a magnetic path through an inner rod 38 of a ferromagnetic material. The outer tube 36 and inner rod 38 cooperate with each other to form a dual-walled support structure 34. With increased cross sectional areas of the magnetic path, the magnetic circuit has reduced resistance, thus producing increased in strength magnetic fields.

As shown in FIG. 9, the outer tube 36 has an inner wall 120 defining a cylindrical bore 122. The cylindrical bore 122 includes two cylindrical end bore sections 124 and 126 and a reduced diameter intermediate cylindrical bore section 128. The inner wall 120 of the outer tube 36 includes two end wall portions 130 and 132 defining the cylindrical end bore sections 124 and 126, respectively. The inner wall 120 also includes two transfer wall portions 134 and 136. The transfer wall portion 134 tapers away from the cylindrical end bore section 124 toward the reduced diameter intermediate cylindrical bore section 128. The other transfer wall portion 136 tapers away from the other cylindrical end bore section 126 toward the reduced diameter intermediate cylindrical bore section 128. The inner rod 38 has reduced diameter end portions 138 and 140 and portions 142 and 144 tapering toward the reduced diameter end portions 138 and 140, respectively.

Similarly to the previously embodiment, the four first pairs of opposed permanent magnets 40 and 42, 44 and 46, 48 and 50, and 52 and 54 are disposed between the outer tube 36 and the inner rod 38, and the four second pairs of opposed permanent magnets 56 and 58, 60 and 62, 64 and 66, and 68 and 70 are disposed between the outer tube 36 and the inner rod 38. Viewing in FIG. 9, each of the first pairs has one magnet 40 or 48 engaging the reduced diameter end portion 138 of the inner rod 38 and the adjacent tapering portion 142, and the other magnet 42 or 50 engaging the end wall portion 130 and the adjacent transfer wall portion 134. Each of the second pairs has one magnet 56 or 64 engaging the reduced diameter end portion 140 of the inner rod 38 and the adjacent tapering portion 144, and the other magnet 58 or 60 engaging the end wall portion 132 and the adjacent transfer wall portion 136.

Owing to the above described structure of the magnetic device, a sufficiently large cross sectional area of a magnetic path is provided without any increase in outer diameter of the inner rod and that of the outer tube, thus preventing magnetic saturation from taking place.

Figure 10:
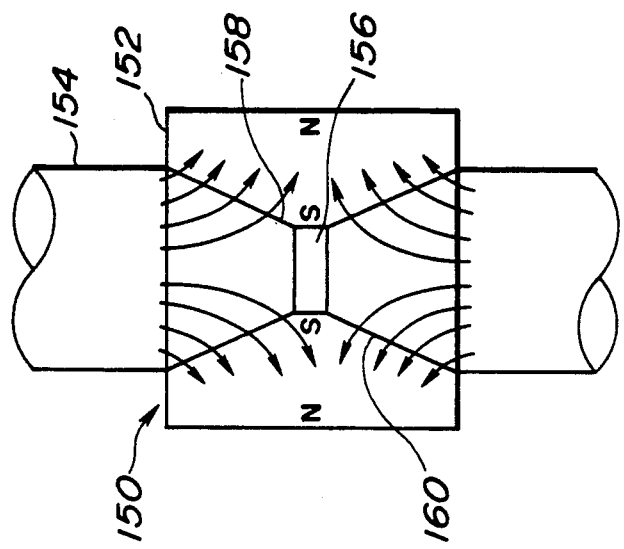
FIG. 10 is a fragmentary diagram of a magnetic device of another embodiment of an electromagnetic strut.

FIG. 10 is a diagram of illustrating the manner how feature of the previously described embodiment is embodied in a magnetic device of the type used in an electromagnetic strut disclosed in Japanese Patent First (unexamined) Publication No. 2-37016 claiming priority on U.S. Pat. application Ser. No. 200,025 filed May 27, 1988.

As shown in FIG. 10, a magnetic device 150 has a permanent magnet 152 and a support structure in the form of a rod 154 of a ferromagnetic material. The rod 154 has a reduced diameter portion 156 and portions 158 and 160 tapering toward the reduced diameter portion 156. The permanent magnet 152 engages the reduced diameter portion 156 and the tapering portions 158 and 160.

I claim:

1. An electromagnetic strut, comprising:
a coil assembly; and
a magnetic device movable relative to said coil assembly along a predetermined axis,
wherein said magnetic device includes a magnetic circuit, said magnetic circuit including a plurality of permanent magnets which are arranged to produce two magnetic fields spaced at a distance along said predetermined axis and said coil assembly extending through said magnetic fields, with said magnetic device including a plurality of such magnetic circuits equi-angularly spaced one after another;
said coil assembly including a plurality of coils arranged along said predetermined axis; and
a dual-walled support structure having an outer tube of a ferromagnetic material and an inner rod of a ferromagnetic material, and wherein said plurality of permanent magnets include a plurality of first pairs of opposed permanent magnets, each of said first pairs being attached to said outer tube and said inner rod, respectively, a plurality, corresponding in number to said plurality of first pairs, of second pairs of opposed permanent magnets, each of said second pairs being attached to said outer tube and said inner rod, respectively.

2. An electromagnetic strut as claimed in claim 1, wherein said plurality of first pairs of permanent magnets are aligned with and spaced at said distance along said predetermined axis from said plurality of second pairs of permanent magnets.

3. An electromagnetic strut as claimed in claim 2, wherein each of said first pairs of permanent magnets cooperates with the aligned one of said second pairs of permanent magnets, said outer tube and said inner rod to form a magnetic circuit.

4. An electromagnetic strut as claimed in claim 3, wherein each of said first pairs of permanent magnets produces a radially inwardly directed magnetic field, while each of said second pairs of permanent magnets produces a radially outwardly directed magnetic field.

5. An electromagnetic strut as claimed in claim 4, wherein said coil assembly includes a coil carrier supporting said plurality of coils.

6. An electromagnetic strut as claimed in claim 5, wherein said coil carrier includes a sleeve around which said plurality of coils are wound, said sleeve extending through said magnetic field produced by each of said first pairs of permanent magnets and said magnetic field produced by each of said second pairs of permanent magnets.

7. An electromagnetic strut as claimed in claim 6, wherein each of said coils has an axial dimension less than said distance.

8. An electromagnetic strut as claimed in claim 7, wherein said magnetic device has a dust cover fixedly coupled with said outer tube, said dust cover including a cylinder with a cylindrical inner wall defining a cylindrical bore, an end plug fixedly coupled with said cylinder to close said cylindrical bore and an inwardly projected support fixed to said end plug and fixedly coupled with said inner rod at one end thereof.

9. An electromagnetic strut as claimed in claim 8, wherein said inner rod has an opposite end.

10. An electromagnetic strut as claimed in claim 9, wherein said magnetic device includes an annular spacer coupled with said rod and disposed between said plurality of first pairs of permanent magnets and said plurality of second pairs of permanent magnets.

11. An electromagnetic strut as claimed in claim 10, wherein said annular spacer includes a journal engaging said sleeve of said coil carrier.

12. An electromagnetic strut as claimed in claim 9, wherein said magnetic device includes a journal fixedly attached to said inner rod at said opposite end thereof and engaging said sleeve of said coil carrier, and said coil carrier includes a journal engaging said cylindrical inner wall of said cylinder of said dust cover.

13. An electromagnetic strut as claimed in claim 6, wherein said outer tube has inner wall means defining a cylindrical bore including cylindrical end bore sections and a reduced diameter intermediate cylindrical bore section, said inner wall means including end wall portions defining said cylindrical end bore sections, respectively, and transfer wall portions tapering away from said cylindrical end bore sections, respectively, toward said reduced diameter intermediate cylindrical bore section, and said inner rod having reduced diameter end portions and portions tapering toward said reduced diameter end portions, respectively.

14. An electromagnetic strut as claimed in claim 13, wherein each pair of said plurality of first pairs of opposed permanent magnets have one magnet engaging one of said reduced diameter end portion of said inner rod and the adjacent portion tapering toward said one reduced diameter end portion and the other magnet engaging one of said end wall portions and the adjacent one of said transfer wall portions.

15. An electromagnetic strut as claimed in claim 14, wherein each pair of said plurality of second pairs of opposed permanent magnets have one magnet engaging the other of said reduce diameter end portions of said inner rod and the adjacent portion tapering toward said other reduced diameter end portion and the other magnet engaging the other of said end wall portions and the adjacent one of said transfer wall portions.

16. An electromagnetic strut as claimed in claim 1, wherein said outer tube has inner wall means defining a cylindrical bore including cylindrical end bore sections and a reduced diameter intermediate cylindrical bore section, said inner wall means including end wall portions defining said cylindrical end bore sections, respectively, and transfer wall portions tapering away from said cylindrical end bore sections, respectively, toward said reduced diameter intermediate cylindrical bore section, and said inner rod having reduced diameter end portions and portions, tapering toward said reduced diameter end portions, respectively.

17. An electromagnetic strut as claimed in claim 16, wherein each pair of said plurality of first pairs of opposed permanent magnets have one magnet engaging one of said reduced diameter end portion of said inner rod and the adjacent portion tapering toward said one reduced diameter end portion and the other magnet engaging one of said end wall portions and the adjacent one of said transfer wall portions.

18. An electromagnet strut as claimed in claim 17, wherein each pair of said plurality of second pairs of opposed permanent magnets have one magnet engaging the other of said reduced diameter end portion of said inner rod and the adjacent portion tapering toward said the other reduced diameter end portion and the other magnet engaging the other of said end wall portions and the adjacent one of said transfer wall portions.

19. An electromagnetic strut, comprising:
a coil assembly including a plurality of coils arranged along a predetermined axis;
a magnetic device movable relative to said coil assembly along said predetermined axis, said magnetic device including a magnetic circuit, said magnetic circuit including a plurality of permanent magnets arranged to produce two magnetic fields spaced at a distance along the predetermined axis;
said plurality of coils of said coil assembly extending through said magnetic fields;
each of the plurality of coils having an axial dimension less than the distance at which the two magnetic fields of said magnetic circuit are spaced;
stroke sensor means for detecting a stroke of movement of said magnetic device relative to said coil assembly along said predetermined axis and generating a stroke indicative signal indicative of said stroke detected;

acceleration sensor means for detecting an acceleration of said movement of said magnetic device relative to said coil assembly and generating an acceleration indicative signal indicative of said acceleration detected;

load sensor means for detecting a load which said magnetic device and coil assembly are subject to along said predetermined axis and generating a load indicative signal indicative of said load detected;

a control unit operatively coupled with said stroke sensor means, said acceleration sensor means and said load sensor mean for receiving said stroke indicative signal, said acceleration indicative signal and said load indicative signal, said control unit including:

means for supplying electric current to one of the coils disposed within one of the two magnetic fields to flow in a first direction perpendicular to the direction of said one magnetic field and also to the predetermined axis along which the magnetic device is moveable; and means for supplying electric current to another one of the coils disposed within the other of the two magnetic fields to flow in a second direction perpendicular to the direction of said the other magnetic field and also to the predetermined axis along which the magnetic device is moveable.

20. An electromagnetic strut, comprising:

a magnetic device movable along a predetermined axis, said magnetic device including a magnetic circuit, said magnetic circuit including a plurality of permanent magnets arranged to produce two magnetic fields spaced at a distance along said predetermined axis;

a coil assembly having a coil carrier including a sleeve and a plurality of coils arranged along said predetermined axis and winding said sleeve, said sleeve extending through said two magnetic fields.

* * * * *